United States Patent [19]

Beck et al.

[11] Patent Number: 5,321,134
[45] Date of Patent: Jun. 14, 1994

[54] WATER-SOLUBLE PHTHALOCYANINE DYES, PROCESSES FOR THEIR PREPARATION AND THEIR USE

[75] Inventors: Thomas Beck, Bad Soden am Taunus; Werner H. Russ, Flörsheim am Main; Wilhelm Mühlig, Frankfurt am Main, all of Fed. Rep. of Germany

[73] Assignee: Hoechst Aktiengesellschaft, Frankfurt am Main, Fed. Rep. of Germany

[21] Appl. No.: 972,139

[22] Filed: Nov. 5, 1992

[30] Foreign Application Priority Data

Nov. 8, 1991 [DE] Fed. Rep. of Germany ....... 4136782

[51] Int. Cl.$^5$ ............................................. C09B 47/24
[52] U.S. Cl. .................................................... 540/126
[58] Field of Search ............... 540/123, 124, 125, 126, 540/127; 8/661

[56] References Cited

U.S. PATENT DOCUMENTS

| | | | |
|---|---|---|---|
| 3,758,470 | 9/1973 | Ackerman et al. | 534/622 |
| 4,350,632 | 9/1982 | Springer | 540/134 |
| 4,505,714 | 3/1985 | Omura et al. | 540/126 |
| 4,634,448 | 1/1987 | Ajioka | 8/436 |
| 4,649,193 | 3/1987 | Meininger et al. | 534/622 |
| 4,693,725 | 9/1987 | Yamauchi et al. | 8/661 |
| 4,812,558 | 3/1989 | Omura et al. | 540/126 |
| 4,939,243 | 7/1990 | Meininger et al. | 534/625 |
| 5,227,475 | 7/1993 | Buch et al. | 544/197 |

FOREIGN PATENT DOCUMENTS

| | | |
|---|---|---|
| 0073267 | 9/1983 | European Pat. Off. . |
| 2569213 | 2/1986 | France . |
| 836647 | 6/1960 | United Kingdom . |
| WO90/13604 | 11/1990 | World Int. Prop. O. . |

OTHER PUBLICATIONS

U.S. patent application Ser. No. 07/776,308 (copy is as originally filed, without any amendments).

Primary Examiner—Mukund J. Shah
Assistant Examiner—P. K. Sripada

[57] ABSTRACT

There are described water-soluble phthalocyanine dyes, in particular copper phthalocyanine and nickel phthalocyanine dyes, which have the formula (1) defined hereinafter and can be used for the dyeing and printing of hydroxy and/or carboxyamido-containing fiber material, such as cotton, wool and synthetic polyamide, by the techniques customary in the art for fiber-reactive dyes.

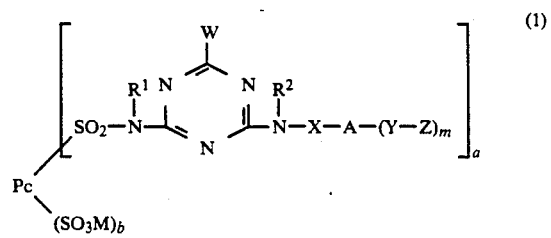

in which Pc is a phthalocyanine radical, $R^1$ and $R^2$ are both hydrogen or alkyl, A is an aromatic carboxylic or heterocyclic radical, which may be substituted by substituents customary in dyes, or is an alkylene radical, which may be substituted by 1 or 2 hetero groups, X is a direct bond or a divalent organic binding link, such as an alkylene radical or an alkyleneamino group, Y is a direct bond or a group of the formula —CO—N-H—alkylene— or a methylamino or β-cyanoethylamino group, Z is a fiber-reactive radical from the vinylsulfonyl series or is β-hydroxyethylsulfonyl, m is the number 1 or 2, W is halogen, sulfo, phenylsulfonyl, alkylsulfonyl of 1 to 4 carbon atoms, alkoxy of 1 to 4 carbon atoms or substituted or unsubstituted aryloxy or W is an amino group of the formula (2) or (3)

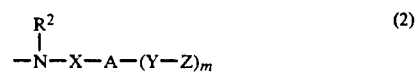

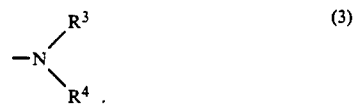

(Abstract continued on next page.)

in which $R^2$, X, A, Y, Z and m have one of the abovementioned meanings, and $R^3$ is hydrogen or substituted or unsubstituted alkyl or cycloalkyl and $R^4$ is hydrogen, substituted or unsubstituted alkyl, substituted or unsubstituted phenyl or cyano, or $R^3$ and $R^4$, together with the nitrogen atom, form a heterocyclic ring, a is a number from 1 to 4 and b is a number from zero to 3, and the sum of (a+b) is a number from 1 to 4, and M is a hydrogen atom or an alkali metal or another salt-forming metal.

19 Claims, No Drawings

WATER-SOLUBLE PHTHALOCYANINE DYES, PROCESSES FOR THEIR PREPARATION AND THEIR USE

The invention is in the technical field of fiber-reactive dyes.

Fiber-reactive phthalocyanine dyes containing a fiber-reactive group from the halotriazine series and in addition a fiber-reactive radical from the vinylsulfonyl series bound via an N-aryl- or N-alkylsulfonamide radical are disclosed, for example, in European Published Patent Application No. 0,073,267 A and U.S. Pat. Nos. 4,505,714, 4,693,725 and 4,812,558. Despite the excellent coloristic properties of these known dyes, it was desirable to develop dyes having an increased degree of fixation and producing dyeings having an improved coloristic color strength. The reason for this is that the practice of dyeing with reactive dyes has recently led to increased demands on the quality of the dyeings and the economy of the dyeing process. As a result thereof, there is still a need for new reactive dyes exhibiting not only good fastness properties of the dyeings obtainable therewith but also a high degree of fixation on the material to be dyed.

Using the present invention, new water-soluble phthalocyanine dyes have now been found which produce high-quality, brilliant bluish green dyeings and have the formula (1)

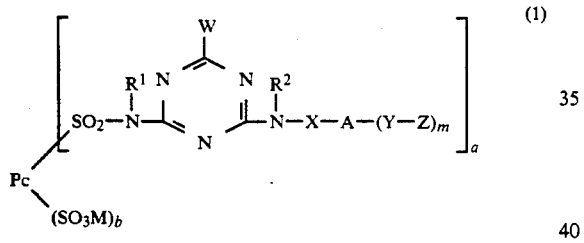

(1)

In formula (1):

Pc is the radical of a metal-free or metal-containing phthalocyanine, such as, for example, of copper phthalocyanine, cobalt phthalocyanine or nickel phthalocyanine, it being possible for the phthalocyanine radical to be additionally substituted in the 3 position and/or 4 position of the carbocyclic aromatic rings, such as, for example, by halogen atoms, such as chlorine atoms, or aryl radicals, such as phenyl radicals, the sulfonamide and sulfo groups being bound in the 3 position and/or 4 position of the carbocyclic aromatic rings of the phthalocyanine;

$R^1$ is hydrogen or alkyl of 1 to 4 carbon atoms, such as methyl and ethyl, preferably hydrogen;

$R^2$ is hydrogen or alkyl of 1 to 4 carbon atoms, such as methyl and ethyl, preferably hydrogen;

X is a direct bond or a divalent organic binding link, such as, for example, an alkylene radical of 1 to 6 carbon atoms, in particular an ethylene or propylene radical, or an alkyleneamino group of the formula -alkylene—N(R)— in which alkylene is an alkylene radical of 1 to 6 carbon atoms, preferably of 2 to 6 carbon atoms, and R is hydrogen or alkyl of 1 to 4 carbon atoms, such as methyl and ethyl, or is, for example, a group of the formula (4a) to (4j)

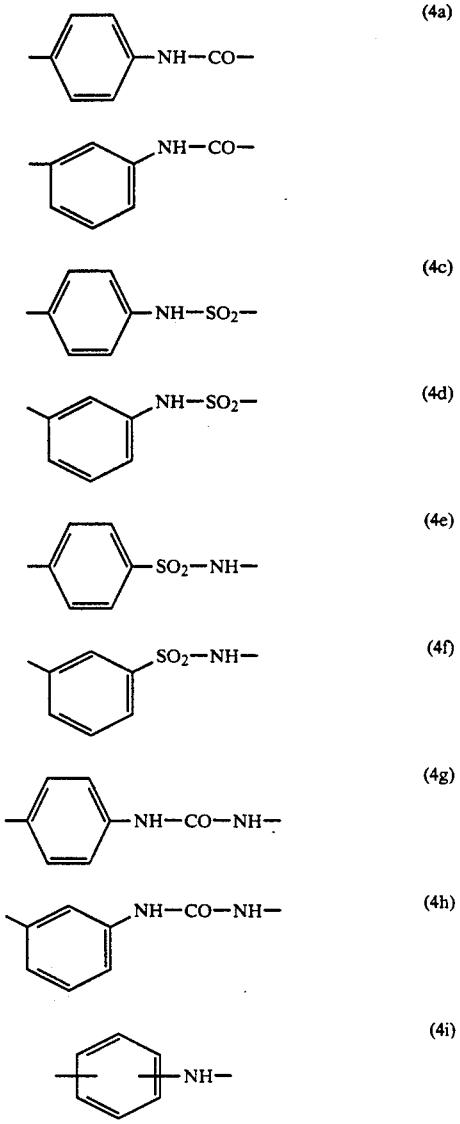

preferably a meta-phenyleneamino group or a group of the formula —$(CH_2)_k$— or of the formula

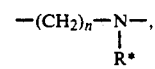

in which k is an integer from 1 to 5, preferably from 1 to 4, n is an integer from 2 to 6, preferably from 2 to 4, R* is hydrogen or alkyl of 1 to 5 carbon atoms, such as ethyl and in particular methyl;

A is an aromatic carbocyclic or aromatic heterocyclic radical, preferably a substituted or unsubstituted phenylene or naphthylene radical, in particular a phenylene or napthylene radical, both of which may be substituted by 1 to 3 substituents from the group comprising alkyl of 1 to 4 carbon atoms, such as methyl and ethyl, alkoxy of 1 to 4 carbon atoms, such as methoxy and ethoxy, halogen, such as chlorine and bromine, carboxy, nitro and sulfo, or is an alkylene radical of 1 to 8 carbon atoms, preferably 2 to 6 carbon atoms, or is an alkylene radical of 2 to 8 carbon atoms which may be interrupted by 1 or 2 hetero groups, such as —O— or —NH—;

is a direct bond or a group of the formula —CO—N-H—alkylene— where alkylene has the above meaning, or is alkylene of 1 to 6 carbon atoms, preferably of 2 to 4 carbon atoms, such as methylene or in particular 1,2-ethylene or 1,3-propylene, or is a group of the formula

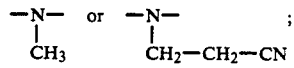

Z is vinylsulfonyl or is ethylsulfonyl containing, in the β position, a substituent which can be eliminated by alkali, such as, for example, β-chloroethylsulfonyl, β-acetoxyethylsulfonyl, β-thiosulfatoethylsulfonyl or β-phosphatoethylsulfonyl, preferably β-sulfatoethylsulfonyl, or is β-hydroxyethylsulfonyl;

m is the number 1 or 2, preferably 1;

W is halogen, such as chlorine and fluorine, sulfo, phenylsulfonyl, alkylsulfonyl of 1 to 4 carbon atoms, such as methylsulfonyl and ethylsulfonyl, alkoxy of 1 to 4 carbon atoms, such as methoxy and ethoxy, or substituted or unsubstituted aryloxy, or W is an amino group of the formula (2)

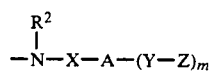 (2)

in which $R^2$, X, A, Y, Z and m have one of the above-mentioned meanings, or is an amino group of the formula (3)

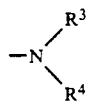 (3)

in which $R^3$ is hydrogen, alkyl of 1 to 4 carbon atoms, such as methyl and ethyl, alkyl of 1 to 4 carbon atoms which is substituted by hydroxy sulfato, sulfo, carboxy or phosphato, or is cycloalkyl of 5 to 8 carbon atoms, such as cyclohexyl, cyclopentyl and dimethylcyclohexyl, and $R^4$ is hydrogen, alkyl of 1 to 4 carbon atoms, such as ethyl and methyl, alkyl of 1 to 4 carbon atoms which is substituted by hydroxy, sulfo, carboxy, sulfato or phosphato, or is phenyl or phenyl which is substituted by 1, 2 or 3 substituents from the group comprising alkyl of 1 to 4 carbon atoms, such as methyl and ethyl, alkoxy of 1 to 4 carbon atoms, such as ethoxy and methoxy, halogen, such as chlorine and bromine, carboxy, nitro and sulfo, or is cyano, or $R^3$ and $R^4$, together with the nitrogen atom, form the radical of a 4- to 8-membered heterocyclic ring, having an alkylene radical of 3 to 8 carbon atoms, preferably 4 to 6 carbon atoms, or having a further hetero atom, such as a nitrogen atom or an oxygen atom, and two alkylene radicals of 1 to 4 carbon atoms, such as, for example, an N-piperidino, N-piperazino, or N-morpholino radical;

a is an integer from 1 to 4, preferably 2, 3 or 4;

b is an integer from zero to 3;

the sum of (a+b) is 1 to 4;

M is a hydrogen atom or an alkali metal, such as sodium, potassium or lithium, or another salt-forming metal.

The formula members can have meanings which are identical to or different from one another.

As a rule, the phthalocyanine dyes according to the invention are obtained in the form of mixtures of the individual compounds of the formula (1), these individual compounds differing from one another by the degree of substitution of the carboxy, sulfo, carboxamide and sulfonamide groups on the phthalocyanine radical, i.e. by the magnitude of indices a and b The formulae of the phthalocyanine dyes according to the invention therefore contain indices which, as a rule, are fractional numbers.

A sulfo group is a group of the formula $-SO_3M$ where M has the abovementioned meaning; similarly, a carboxy group is a group of the formula —COOM, a sulfato group a group of the formula $-OSO_3M$, a thiosulfato group a group of the formula $-S-SO_3M$ and a phosphato group a group of the formula $-OPO_3M_2$, where M has in each case the above-mentioned meaning.

The phthalocyanine dyes according to the invention of the formula (1) are present in the form of their salts, such as the alkali metal salts, and are used as such for the dyeing of fiber materials.

Preferably, aryl radicals are substituted or unsubstituted naphthyl radicals, such as sulfo-substituted naphthyl radicals, and in particular substituted phenyl radicals, preferably those having 1 or 2 substituents from the group comprising methyl, ethyl, methoxy, ethoxy, chlorine, carboxy and sulfo.

Preferred compounds of the formula (1) are those in which Pc is a nickel-phthalocyanine radical and in particular the copper phthalocyanine radical, furthermore those compounds of the formula (1) in which $R^1$ or $R^2$ or both are hydrogen, furthermore those in which A is a meta- or para-phenylene radical, which may be substituted by sulfo, methyl and/or methoxy, or is ethylene or n-propylene, and furthermore those in which W is chlorine, fluorine or cyano.

Examples of radicals of the formula (2) which are or can be present in the compounds of the formula (1) are 2-(β-sulfatoethylsulfonyl)phenylamino, 3-(β-sulfatoethylsulfonyl)phenylamino, 4-(β-sulfatoethylsulfonyl)phenylamino, 2-carboxy-5-(β-sulfatoethylsulfonyl)phenylamino, 2-chloro-3-(β-sulfatoethylsulfonyl)phenylamino, 2-chloro-4-(β-sulfatoethylsulfonyl)phenylamino, 2-ethoxy-4- or -5-(β-sulfatoethylsulfonyl)phenylamino, 2-ethyl-4-(β-sulfatoethylsulfonyl)phenylamino, 2-methoxy-5-(β-sulfatoethylsulfonyl)phenylamino, 2,4-diethoxy-5-(β-sulfatoethylsulfonyl)phenylamino, 2,4-dimethoxy-5-(β-sulfatoethylsulfonyl)phenylamino, 2,5-dimethoxy-4-(β-sulfatoethylsulfonyl)phenylamino, 2-methoxy-5-methyl-4-(β-sulfatoethylsulfonyl)phenylamino, 2- or 3- or 4-(β-thiosulfatoethylsulfonyl)phenylamino, 2-methoxy-5-(β-thiosulfatoethylsulfonyl)phenylamino, 2-sulfo-4-(β-phosphatoethylsulfonyl)phenylamino, 2-sulfo-4-vinylsulfonylphenylamino, 2-hydroxy-4- or -5-(β-sulfatoethylsulfonyl)phenylamino, 2-chloro-4- or -5-(β-chloroethylsulfonyl)phenylamino, 2-hydroxy-3-sulfo-5-(β-sulfatoethylsulfonyl)phenylamino, 3- or 4-(β-acetoxyethylsulfonyl)phenylamino, 2-methoxy-4-[β-(N-methyltauryl)e- thylsulfonyl]phenylamino, 5-($\beta$-sulfatoethylsulfonyl)-naphth-2-ylamino, 6- or 7- or 8-($\beta$-sulfatoethylsulfonyl)-naphth-2-ylamino, 6-($\beta$-sulfatoethylsulfonyl)-1-sulfonaphth-2-ylamino, 5-($\beta$-sulfatoethylsulfonyl)-1-sulfonaphth-2-ylamino, 8-($\beta$-sulfatoethylsulfonyl)-6-sulfonaphth-2-ylamino, $\beta$-[4-($\beta'$-sulfatoethylsulfonyl)phen]ethylamino, $\beta$-[2-sulfo-4-($\beta'$-sulfatoethylsulfonyl)phen]ethylamino, $\beta$-($\beta'$-chloroethylsulfonyl)ethylamino, $\beta$-($\beta'$-sulfatoethylsulfonyl)ethylamino, $\beta$-(vinylsulfonyl)ethylamino, $\gamma$-($\beta'$-chloroethylsulfonyl)propylamino, $\gamma$-($\beta'$-sulfatoethylsulfonyl)propylamino, $\gamma$-($\beta'$-bromoethylsulfonyl)propylamino, $\gamma$-(vinylsulfonyl)propylamino, 1-methyl-1-($\beta$-sulfatoethylsulfonyl)-1-ethylamino, $\delta$-($\beta'$-sulfatoethylsulfonyl)butylamino, 2-methyl-2-($\beta$-chloroethylsulfonyl)-1-propylamino, $\omega$-($\beta'$-chloroethylsulfonyl)pentylamino, $\beta$-($\beta'$-chloroethylsulfonyl)-n-hexylamino, N-methyl-N-[$\beta$-($\beta'$-chloroethylsulfonyl)ethyl]amino, N-ethyl-N-[$\beta$-($\beta'$-chloroethylsulfonyl)ethyl]amino, N-n-propyl-N-[$\beta$-($\beta'$-chloroethylsulfonyl)ethyl]amino, N-n-butyl-N-[$\beta$-($\beta'$-chloroethylsulfonyl)ethyl]amino, $\beta$-[$\beta'$-($\beta''$-chloroethylsulfonyl)ethylamino]ethylamino, $\beta$-[$\beta'$-($\beta''$-sulfatoethylsulfonyl)ethylamino]ethylamino, $\beta$-[$\beta'$-($\beta''$-chloroethylsulfonyl)ethoxy]ethylamino, $\beta$-[$\beta'$-($\beta''$-sulfatoethylsulfonyl)ethoxy]ethylamino, 3,4-di-($\beta$-sulfatoethylsulfonyl)phenylamino, 2,5-di($\beta$-sulfatoethylsulfonyl)phenylamino, 4-[$\gamma$-($\beta'$-sulfatoethylsulfonyl)propoxy]phenylamino, 2,5-bis-[($\beta$-sulfatoethylsulfonyl)methyl]phenylamino, 3- or 4-[$\gamma$-($\beta'$-sulfatoethylsulfonyl)propylamidocarbonyl]phenylamino and 3,5-bis-[$\gamma$-($\beta'$-sulfatoethylsulfonyl)propylamidocarbonyl]phenylamino Examples of radicals of the formula $-NR^3R^4$, which can be present in the compounds of the formula (1), are methylamino, ethylamino, n-butylamino, benzylamino, phenylamino, $\beta$-hydroxyethylamino, dimethylamino, diethylamino, di(isopropyl)amino, N-methylbenzylamino, N-methylphenylamino, N-piperidino, N-morpholino, di($\beta$-hydroxyethyl)amino, $\beta$-sulfoethylamino, $\beta$-carboxyethylamino, $\beta$-(4-carboxyphenyl)ethylamino, 3-sulfophenylamino, 4-sulfophenylamino, the primary amino group and the cyanamido radical.

The present invention furthermore relates to processes for the preparation of the phthalocyanine dyes of the formula (1), which comprise reacting a compound of the formula (5)

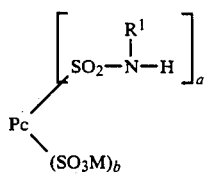

(5)

in which the individual formula radicals have the meanings given for formula (1), with a halotriazine compound of the formula (6)

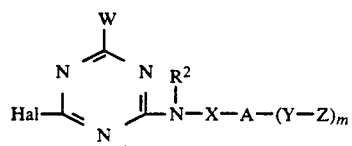

(6)

in which Hal is halogen, such as chlorine and fluorine, and W, $R^2$, X, A, Y, Z and m have one of the abovementioned meanings, or reacting a compound of the formula (7)

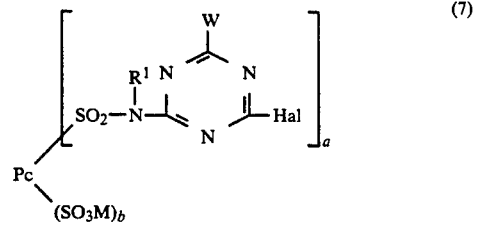

(7)

in which the formula radicals have the meanings given for formula (1), with an amino compound of the formula (8)

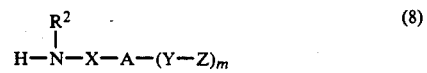

(8)

in which $R^2$, X, A, Y, Z and m have one of the abovementioned meanings, the $\beta$-hydroxyethylsulfonyl-containing phthalocyanine compound being converted, in the case where Z is a hydroxyethylsulfonyl group and W is not a halogen atom, into a phthalocyanine dye of the formula (1) where the radical Z has a different meaning, in a manner known per se, or reacting a compound of the formula (9)

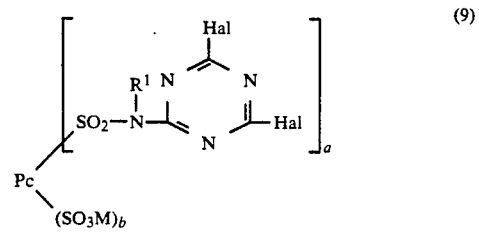

(9)

in which the individual formula radicals have the meanings given for formula (1) and Hal is chlorine or fluorine, with an amine of the formula (1) in an equivalent or twice the equivalent amount, in order to produce a phthalocyanine dye of the formula (1) in which W is an amino group of the formula (2) or a halogen atom.

Which of the procedures for the preparation of the phthalocyanine dyes of the formula (1) according to the invention is preferably used or advantageously carried out depends in particular on the solubility of the amino-containing starting compounds involved and on their basicity. The procedures in which the compound (7) or (9) is reacted with the amine (8) are preferred.

The reactions according to the invention can be carried out in aqueous or aqueous-organic medium. If the medium is an aqueous-organic medium, the organic solvent portion is a water-miscible solvent which is inert towards the reactant and reaction conditions, such as, for example, dimethylsulfoxide, acetone and an N-alkylacylamide, such as dimethylformamide. The reactions of the amino-containing phthalocyanine compounds or of the amines with the halotriazine compounds are carried out in a manner known per se and under the customary process conditions known for analogous reactions between amines or cyanamide and a halotriazine (see, for example, European Published Patent Application No. 0,218,131A and U.S. Pat. Nos.

3,758,470 and 4,350,632). As a rule, the reaction between a compound of the formula (5) and a halotriazine of the formula (6) is carried out at a temperature of between 40° and 90° C., preferably between 60° and 80° C., and at a pH of between 2 and 7, preferably between 3 and 5. The reaction between a compound of the formula (7) and an amino compound of the formula (8) is, as a rule, carried out at a temperature of between 25° and 50° C., preferably between 30° and 40° C., and at a pH of between 3 and 11, preferably between 3.5 and 7. The compounds of the formula (9) are, as a rule, reacted with the amino compound of the formula (8) at a temperature of between 25° and 50° C., preferably between 30° and 40° C., and at a pH of between 3 and 11, preferably between 5 and 9.

If, in the process according to the invention for the preparation of the phthalocyanine compounds of the formula (1), the starting amine is one of the formula (8) in which Z is a β-hydroxyethylsulfonyl group, the phthalocyanine compound obtained can be converted into another phthalocyanine compound according to the invention containing an ester group, such as, for example, a sulfato group in the β-position of the ethylsulfonyl radical. This esterification reaction is carried out analogously to known procedures using the esterifying and acylating agents customary for such acids, such as, for example, acid anhydride, polyphosphoric acid, phosphorus pentachloride and, in particular, 96–100% sulfuric acid or sulfuric acid containing sulfur trioxide, such as oleum having a sulfur trioxide content of up to 35%, or chlorosulfonic acid for introducing the sulfato group. The reaction with sulfuric acid or sulfuric acid containing sulfur trioxide is carried out at a temperature of between 0° C. and 25° C. The reaction with chlorosulfonic acid can also take place in a polar organic solvent, such as, for example, N-methylpyrrolidone, at 10° to 80° C.

The starting compounds of the formula (5) are prepared in a manner known per se for the reaction of phthalocyaninesulfonyl chlorides with amino compounds, for example by reaction of a phthalocyaninesulfonyl chloride of the formula (10)

in which

Pc and M have the abovementioned meanings,
p is an integer from 1 to 4, and
q is an integer from zero to 3,
the sum of (p+q) being an integer from 1 to 4, or of a mixture of these compounds of the formula (11) in an aqueous or aqueous-organic medium with an amine of the formula H$_2$NR$^1$, in which R$^1$ has the abovementioned meanings.

During reaction of the phthalocyaninesulfonyl chlorides of the formula (10) with an amino compound of the formula H$_2$NR$^1$, preferably ammonium, partial hydrolysis of the sulfonyl chloride groups can take place simultaneously with the reaction.

The starting compounds of the general formulae (7) and (9) are obtained analogously to known procedures of the reaction of amino compounds or sulfonamide compounds with halotriazine compounds or with a cyanuric halide (1,3,5-halo-s-triazine), for example by reaction of a compound of the formula (5) with a cyanuric halide, such as cyanuric chloride or cyanuric fluoride, or a dihalo-s-triazine of the formula (11)

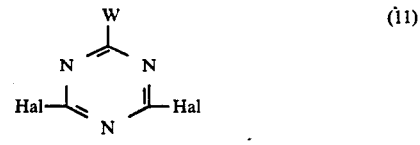

in which Hal and W have the abovmentioned meaning, it being possible for the reactions to be carried out either in aqueous or in the abovementioned aqueous-organic medium at a temperature of between 0° and 25° C. and a pH of between 7 and 14 preferably between 10 and 12.

Starting compounds of the formula (7) in which W is an amino group of the formula (3) can be obtained by reaction of a compound of the formula (9) with an amine of the formula HNR$^3$R$^4$ at a temperature of between 25° and 40° C. and a pH of between 3 and 11.5, preferably between 5 and 9, in aqueous medium or in the abovementioned aqueous-organic medium.

Starting compounds of the formula (7) in which W is a cyanamido group are obtained by reaction of a compound of the formula (9) with cyanamide or an alkali metal salt thereof at a pH of between 7 and 10, preferably between 8 and 9, and a temperature of between 10° and 50° C., preferably between 30° and 40° C. in aqueous medium.

Starting compounds of the formula (6) are obtained by reaction of a cyanuric halide or a cyanamidodihalotriazine (disclosed in U.S. Pat. No. 3,758,470) or of a aminodihalo-s-triazine known per se (see, for example, U.S. Pat. No. 4,649,193, U.S. Pat. No. 4,939,243 and European Published Patent Application No. 0,324,373) of the formula (11) with an amino compound of the formula (8) at a temperature of between 0° and 10° C. and a pH of between 3 and 6 in aqueous or in the abovementioned aqueous-organic medium.

Phthalocyanine dyes of the formula (1) can be converted into phthalocyanine dyes of the formula (1) having a different substituent which can be eliminated by alkali in the fiber-reactive radical Z by a customary and known procedure. Procedures of this type have been described in large numbers in the literature on fiber-reactive dyes containing a fiber-reactive radical from the vinylsulfonyl series. Thus, phthalocyanine dyes containing a β-sulfatoethylsulfonyl radical can be converted into phthalocyanine dyes containing a vinylsulfonyl group as the radical Z by treatment with an alkali, such as in aqueous sodium hydroxide solution, at a temperature of 0° to 40° C. for a few minutes. Phthalocyanine dyes according to the invention containing a β-thiosulfatoethylsulfonyl radical can be obtained, for example, from phthalocyanine dyes having a vinylsulfonyl group by reaction with sodium thiosulfate.

The condensation reactions according to the invention between the compounds of the formula (10) and the amines H$_2$NR$^1$ take place at a pH of between 3.5 and 10, preferably between 6 and 9, and at a temperature of between 0° C. and 100° C., preferably between 20° and 70° C., in particular between 40° and 60° C.

Substituted and unsubstituted phthalocyaninesulfonyl chlorides have long been known in the literature, for example in U.S. Pat. No. 4,505,714 and German Patent No. 891,121.

Examples of phthalocyanine starting compounds of the formula (10) are the sulfonyl chlorides and sulfo-containing sulfonyl chlorides of the metal-free phthalocyanine and preferably, of the copper phthalocyanine, cobalt phthalocyanine and nickel phthalocyanine, such as, for example the mono-, di-, tri- and tetrasulfonyl chlorides of copper phthalocyanine, cobalt phthalocyanine and nickel phthalocyanine, thus for example copper phthalocyanine-(3)-monosulfonyl chloride, copper phthalocyanine-(3)-disulfonyl chloride, copper phthalocyanine-(3)-trisulfonyl chloride, copper phthalocyanine-(3)-tetrasulfonyl chloride, nickel phthalocyanine(3)-tetrasulfonyl chloride, cobalt phthalocyanine-(3)-monosulfonyl chloride, cobalt phthalocyanine-(3)-di- and -trisulfonyl chloride, copper phthalocyanine(4)-mono- and -disulfonyl chloride, copper phthalocyanine-(4)-tri- and -tetrasulfonyl chloride, and furthermore the sulfonyl chlorides of this type containing, in addition, other substituents on the phthalocyanine ring, such as phenyl radicals and halogen atoms, such as, for example, the sulfonyl chlorides of copper tetraphenylphthalocyanine or nickel tetrachlorophthalocyanine.

Examples of acid-binding agents used in the process according to the invention for the preparation of the phthalocyanine dyes of the formula (1) are hydroxides, carbonates, bicarbonates, secondary phosphates, tertiary phosphates, borates and acetates of metals from Group I to Group III of the Periodic Table, preferably of the alkali metals, such as of sodium, potassium and lithium, and of the alkaline earth metals, such as those of calcium.

The process according to the invention for the preparation of the compounds (1) is preferably carried out in aqueous medium. For improving the solubility of the starting or end products in the aqueous reaction medium, it is possible, if desired, to add an organic solvent, preferably an amide of an aliphatic carboxylic acid, such as dimethylformamide or N-methylpyrrolidone.

Separation of the phthalocyanine dyes of the formula (1) prepared according to the invention, hereinafter designated as "dyes (1)", from the synthesis batches is carried out by generally known methods, either by precipitation from the reaction medium by means of electrolytes, such as, for example, sodium chloride or potassium chloride, or by evaporation of the reaction solution, for example by spray-drying, it being possible to add a buffer substance to this reaction solution. The dyes according to the invention have fiber-reactive properties and exhibit very good dye properties. Accordingly, they can be used for the dyeing and printing of hydroxy- and/or carboxamido-containing material, in particular fiber material, and also of leather. Likewise, the solutions formed during synthesis of the compounds according to the invention can be used directly, if desired, after addition of a buffer substance and, if desired, after concentrating, as liquid preparation for dyeing.

Accordingly, the present invention also relates to the use of the dyes (1) for the dyeing (including printing) of hydroxy- and carboxamido-containing materials and to processes for their application to these substrates. Preferably, the materials are used in the form of fiber materials, in particular in the form of textile fibers and yarns, such as hanks, packages and fabrics.

Hydroxy- containing materials are natural or synthetic Hydroxy- containing materials, such as, for example, cellulose fiber materials, including those in the form of paper, or regenerated products thereof and polyvinyl alcohols. Cellulose fiber materials are preferably cotton but also other vegetable fibers; such as linen, hemp, jute and ramie fibers; examples of regenerated cellulose fibers are staple viscose and filament viscose.

Examples of carboxamido-containing materials are synthetic and natural polyamides and polyurethanes, in particular in the form of fibers, for example wool and other animal hair, silk, leather, nylon 6.6, nylon 6, nylon 11 and nylon 4.

The dyes (1) can be applied to the substrates mentioned, in particular to the fiber materials mentioned, and fixed thereon by the application techniques known for water-soluble dyes, in particular for fiber-reactive dyes. Thus, in the exhaust method from long liquor using a wide range of acid-binding agents and, if desired, neutral salts, such as sodium chloride or sodium sulfate, these dyes produce dyeings on cellulose fibers in very good color yields and with excellent color build-up. Dyeing takes place at temperatures of between 40° and 105° C., if appropriate at temperatures of up to 130° C. under pressure, if appropriate in the presence of customary dyeing assistants, in an aqueous bath. The procedure can be such that the material is introduced into the warm bath, which is then gradually heated to the desired dyeing temperature, and the dyeing process is completed at this temperature. The neutral salts, which accelerate exhaustion of the dye, can also, if desired, be added to the bath only after reaching the actual dyeing temperature.

The padding process also produces dyeings on cellulose fibers in excellent color yields and with very good color build-up, it being possible for the dye to be fixed in the usual manner by storage at room temperature or elevated temperature, for example of up to about 60° C., or by steaming or by means of dry heat.

Likewise, high color strength prints with crisp contours and a clear white ground are obtained by the customary printing processes for cellulose fibers, which can either be carried out in a single phase, for example by printing using a printing paste containing sodium bicarbonate or another acid-binding agent and the colorant, followed by steaming at 100° to 103° C., or can be carried out in two phases, for example by printing using a neutral or weakly acidic colorant-containing printing paste, followed by fixing, either by leading the printed material through a hot electrolyte-containing alkaline bath or by over-padding it using an alkaline electrolyte-containing padding liquor, followed by storing this treated material or steaming or treatment with dry heat. The printing result is only slightly dependent on varying fixation conditions. The degrees of fixation obtained with the compounds according to the invention both in dyeing and printing are very high. If fixing is carried out by means of dry heat using the customary dry-heat setting process, hot air at 120° to 200° C. is used. Apart from the customary steam at 101° to 103° C., superheated steam and pressurized steam at temperatures of up to 160° C. can also be used.

Examples of the acid-binding agents and the agent by which fixing of the dyes on the cellulose fibers is achieved are water-soluble basic salts of alkali metals and alkaline earth metals of inorganic or organic acids, and also compounds releasing alkali in the heat. These include in particular alkali metal hydroxides and alkali metal salts of weak to medium strong inorganic or organic acids, alkali metal compounds being preferably understood to mean sodium compounds and potassium compounds. Examples of such acid-binding agents are sodium hydroxide, potassium hydroxide, sodium carbonate, sodium bicarbonate, potassium carbonate, sodium formate, sodium dihydrogen phosphate and disodium hydrogen phosphate.

Treatment of the dyes (1) with the acid-binding agents, if appropriate with the application of heat, effect chemical binding of the dyes to the cellulose fiber; after the customary after-treatment by rinsing so as to remove the unfixed dye portions, in particular the dyeings on cellulose show excellent wet fastness properties, especially since unfixed dye portions can be easily washed off, due to their good solubility in cold water.

The dyeings on polyurethane and polyamide fibers are usually carried out from an acid medium. Thus, for example, in order to obtain the desired pH, acetic acid and/or ammonium sulfate and/or acetic acid and ammonium acetate or sodium acetate can be added to the dye bath. For achieving useful levelness of the dyeing, the addition of customary leveling agents is recommended, such as, for example, those based on a reaction product of cyanuric chloride with three times the molar amount of an aminobenzenesulfonic acid or aminonaphthalenesulfonic acid or those based on a reaction product of, for example, stearylamine with ethylene oxide. As a rule, the material to be dyed is introduced into the bath at a temperature of about 40° C., agitated therein for some time, the dye bath is then readjusted to the desired weakly acidic, preferably slightly acetic acid pH, and the actual dyeing is carried out at a temperature of between 60° and 98° C. However, it is also possible to carry out the dyeings at boiling temperature or at temperatures of up to 120° C. (under pressure).

The dyeings and prints on cellulose fiber materials prepared using the compounds (1) according to the invention have a high color strength, and furthermore good light fastness and good wet fastness properties, such as wash, milling, water, seawater, cross dyeing and perspiration fastness properties, moreover good pleating fastness, hot press fastness and rub fastness. Their alkaline perspiration light fastness and their good wet light fastness of the dyeings wetted with tap water should be mentioned in particular.

The Examples which follow serve to illustrate the invention. The compounds described by way of their formulae are given in the form of the free acid; in general, they are prepared and isolated in the form of their alkali metal salts and used for dyeing in the form of their salts. Likewise, the starting compounds mentioned in the Examples which follow, in particular the Table Examples, in the form of the free acid, can be used in the synthesis as such or in the form of their salts, preferably the alkali metal salts, such as sodium salts or potassium salts.

Parts and percentages given in the Examples are by weight unless stated otherwise. Parts by weight relate to parts by volume as the kilogram relates to the liter.

The formula radical CuPc is the copper phthalocyanine radical, and the formula radical NiPc is the nickel phthalocyanine radical.

The absorption maxima ($\lambda_{max}$) in the visible range given for the compounds according to the invention were determined using their alkali metal salts in aqueous solution. In the Table Examples, the $\lambda_{max}$ values have been put in brackets next to the hue; the wavelength is given in nm.

EXAMPLE 1

138 parts of copper phthalocyaninetetrasulfonyl chloride are stirred in 140 parts of a 25% aqueous ammonia solution at 40° to 60° C. over a period of several hours, the precipitated copper phthalocyaninetetrasulfonamide is then filtered off, dissolved in 1000 parts of water at a pH of 10 to 14, and 38 parts of cyanuric chloride are added to this solution, this reaction being carried out at a pH of between 9 and 11 and at a temperature of between 0° and 3° C. The copper dichlorotriazinylphthalocyaninesulfonamide compound obtained is then reacted with 28 parts of 4-($\beta$-sulfatoethylsulfonyl)aniline at a pH of 3.5 to 6 and a temperature of between 20° and 40° C.

The copper phthalocyanine dye according to the invention obtained has, written in the form of the free acid, the formula

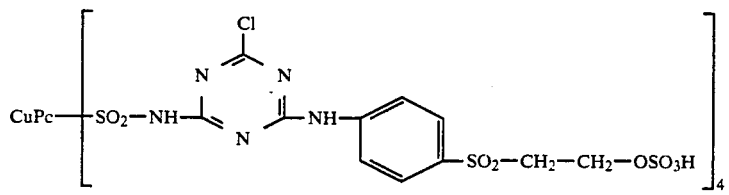

($\lambda_{max}$ = 601 nm).

It is isolated as the alkali metal salt (sodium salt) by evaporation of the synthesis solution under reduced pressure or by spray-drying. It has very good fiber-reactive properties and is highly suitable for the dyeing of the materials mentioned in the description, in particular cellulose fiber materials, by the dyeing and printing processes customary in the art for fiber-reactive dyes, to give turquoise dyeings and prints of high color strength and good fastness properties, of which in particular the good light, wet light and chlorine fastness properties may be mentioned.

EXAMPLE 2

To prepare a copper phthalocyanine dye according to the invention, the procedure of Example 1 is repeated, except that in the last reaction step the same amount of 3-($\beta$-sulfatoethylsulfonyl)aniline is used instead of the 4-($\beta$-sulfatoethylsulfonyl)aniline. The dye according to the invention has an absorption maximum in the visible range at 601 nm and exhibits the same coloristic properties as the dye of Example 1 according to the invention.

EXAMPLE 3

138 parts of copper phthalocyaninetrisulfonyl chloride are stirred in 150 parts of an aqueous 25% ammonia solution at 40° to 60° C. over a period of several hours, the precipitated copper phthalocyaninetrisulfonamide is then filtered off, dissolved in 1000 parts of water at a pH of 10 to 14, and 28 parts of cyanuric chloride are added to this solution, the condensation reaction being carried out at a pH of between 9 and 11 and a temperature of between 0° and 3° C. 21 parts of 4-(β-sulfatoethylsulfonyl)aniline are added to the copper dichloro-triazinylphthalocyaninesulfonamide compound obtained and the second condensation reaction is carried out at a pH of between 3.5 and 6 and a temperature of between 20° and 40° C.

The dye according to the invention obtained which, written in the form of the free acid, has the formula

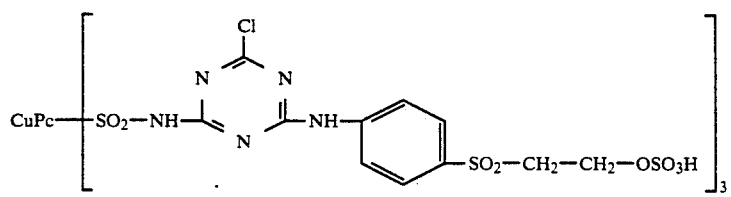

($\lambda_{max}$ = 602 nm).

is isolated as the alkali metal salt (sodium salt) by evaporation of the synthesis solution under reduced pressure or by spray-drying. It has fiber-reactive properties and is highly suitable as dye for the dyeing of the materials mentioned in the description, in particular cellulose fiber materials, by the dyeing procedures customary in the art, to give turquoise dyeings and prints of high color strength and good fastness properties, of which in particular the light, wet light and chlorine fastness properties may be mentioned.

EXAMPLE 4

To prepare a copper phthalocyanine dye according to the invention, the procedure of Example 1 is repeated, except that in the last reaction step the same amount of 3-(β-sulfatoethylsulfonyl)aniline is used instead of the 4-(β-sulfatoethylsulfonyl)aniline. The dye according to the invention has an absorption maximum in the visible range at 602 nm and exhibits the same coloristic properties as the dye of Example 1 according to the invention.

EXAMPLE 5

138 parts of copper phthalocyaninesulfonyl chloride having on average 2.2 chlorosulfonyl groups in the copper phthalocyanine molecule are stirred in 140 parts of a 25% aqueous ammonia solution at 40° to 60° C. over a period of several hours, the precipitated copper phthalocyaninesulfonamide is then filtered off, dissolved in 1000 parts of water at a pH of 10 to 14, and 21 parts of cyanuric chloride are added to this solution, this reaction being carried out at a pH of between 9 and 11 and at a temperature of between 0° and 3° C. The copper dichlorotriazinylphthalocyaninesulfonamide compound obtained is then reacted with 16 parts of 4-(β-sulfatoethylsulfonyl)aniline at a pH of 3.5 to 6 and a temperature of between 20° and 40° C.

The copper phthalocyanine dye according to the invention obtained has, written in the form of the free acid, the formula

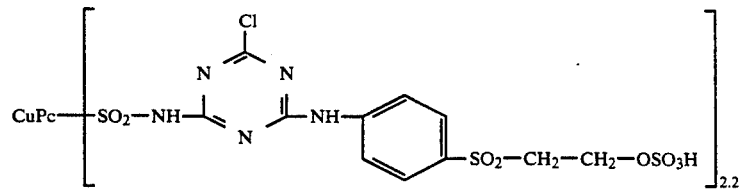

($\lambda_{max}$ = 602 nm).

It is isolated as the alkali metal salt (sodium salt) by evaporation of the synthesis solution under reduced pressure or by spray-drying. It has very good fiber-reactive properties and is highly suitable for the dyeing of the materials mentioned in the description, in particular cellulose fiber materials, by the dyeing and printing processes customary in the art for fiber-reactive dyes, to give turquoise dyeings and prints of high color strength and good fastness properties, of which in particular the good light, wet light and chlorine fastness properties may be mentioned.

EXAMPLE 6

To prepare a copper phthalocyanine dye according to the invention, the procedure of Example 1 is repeated, except that in the last reaction step the same amount of 3-(β-sulfatoethylsulfonyl)aniline is used instead of the 4-(β-sulfatoethylsulfonyl)aniline. The dye according to the invention has an absorption maximum in the visible range at 602 nm and exhibits the same coloristic properties as the dye of Example 1 according to the invention.

EXAMPLES 7 to 100

In the Table Examples which follow, further copper phthalocyanine dyes according to the invention of the formula (A)

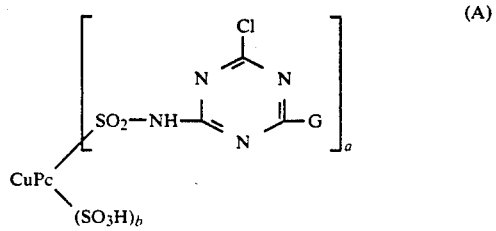

(A)

are described by means of their formula components. They can be prepared by the procedure according to the invention, for example according to one of Examples 1 to 6, using their components apparent from the particular Table Example in combination with the formula (A) (for example, an optionally sulfo-containing copper phthalocyaninesulfonyl chloride, ammonia, cyanuric chloride and a fiber-reactive amino compound of the formula (8) given in the description). They have very good fiber-reactive dyestuff properties and produce dyeings and prints of high color strength on the materials mentioned in the description, in particular cellulose fiber materials, such as cotton, by the known dyeing and printing processes, in the hue listed in the particular Table Example for dyeings on cotton.

| Copper phthalocyanine dyes of the formula (A) | | | | |
|---|---|---|---|---|
| Ex. | Radical G | Index a | Index b | Hue |
| 7 | 4-($\beta$-Sulfatoethyl-sulfonyl)phenylamino | 1 | 3 | turquoise (603) |
| 8 | 4-($\beta$-Sulfatoethyl-sulfonyl)phenylamino | 1 | 2 | turquoise (603) |
| 9 | 3-($\beta$-Sulfatoethyl-sulfonyl)phenylamino | 1 | 3 | turquoise (603) |
| 10 | 3-($\beta$-Sulfatoethyl-sulfonyl)phenylamino | 1 | 2 | turquoise (603) |
| 11 | 2-($\beta$-Sulfatoethyl-sulfonyl)phenylamino | 0 | 4 | turquoise (601) |
| 12 | 2-($\beta$-Sulfatoethyl-sulfonyl)phenylamino | 0 | 3 | turquoise (601) |
| 13 | 2-($\beta$-Sulfatoethyl-sulfonyl)phenylamino | 0 | 2.2 | turquoise (601) |
| 14 | 2-($\beta$-Sulfatoethyl-sulfonyl)phenylamino | 1 | 3 | turquoise (603) |
| 15 | 2-($\beta$-Sulfatoethyl-sulfonyl)phenylamino | 1 | 2 | turquoise (603) |
| 16 | 3-($\beta$-Sulfatoethyl-sulfonyl)propylamino) | 0 | 4 | turquoise (600) |
| 17 | 3-($\beta$-Sulfatoethyl-sulfonyl)propylamino) | 0 | 3 | turquoise (600) |
| 18 | 3-($\beta$-Sulfatoethyl-sulfonyl)propylamino) | 0 | 2.2 | turquoise (600) |
| 19 | 3-($\beta$-Sulfatoethyl-sulfonyl)propylamino) | 1 | 3 | turquoise (601) |
| 20 | 3-($\beta$-Sulfatoethyl-sulfonyl)propylamino) | 1 | 2 | turquoise (601) |
| 21 | 2-($\beta$-Sulfatoethyl-sulfonyl)ethylamino | 0 | 4 | turquoise (600) |
| 22 | 2-($\beta$-Sulfatoethyl-sulfonyl)ethylamino | 0 | 3 | turquoise (600) |
| 23 | 2-($\beta$-Sulfatoethyl-sulfonyl)ethylamino | 0 | 2.2 | turquoise (600) |
| 24 | 2-($\beta$-Sulfatoethyl-sulfonyl)ethylamino | 1 | 3 | turquoise (601) |
| 25 | 2-($\beta$-Sulfatoethyl-sulfonyl)ethylamino | 1 | 2 | turquoise (601) |
| 26 | 3-($\beta$-Chloroethyl-sulfonyl)propylamino | 0 | 4 | turquoise (600) |
| 27 | 3-($\beta$-Chloroethyl-sulfonyl)propylamino | 0 | 3 | turquoise (600) |
| 28 | 3-($\beta$-Chloroethyl-sulfonyl)propylamino | 0 | 2.2 | turquoise (600) |
| 29 | 3-($\beta$-Chloroethyl-sulfonyl)propylamino | 1 | 3 | turquoise (601) |
| 30 | 3-($\beta$-Chloroethyl-sulfonyl)propylamino | 1 | 2 | turquoise (601) |
| 31 | 2-($\beta$-Chloroethyl-sulfonyl)ethylamino | 0 | 4 | turquoise (601) |
| 32 | 2-($\beta$-Chloroethyl-sulfonyl)ethylamino | 0 | 3 | turquoise (601) |
| 33 | 2-($\beta$-Chloroethyl-sulfonyl)ethylamino | 0 | 2.2 | turquoise (601) |
| 34 | 2-($\beta$-Chloroethyl-sulfonyl)ethylamino | 1 | 3 | turquoise (603) |
| 35 | 2-($\beta$-Chloroethyl-sulfonyl)ethylamino | 1 | 2 | turquoise (603) |
| 36 | 2-Methoxy-5-($\beta$-sulfato-ethylsulfonyl)phenyl-amino | 0 | 4 | turquoise (605) |
| 37 | 2-Methoxy-5-($\beta$-sulfato-ethylsulfonyl)phenyl-amino | 0 | 3 | turquoise (605) |
| 38 | 2-Methoxy-5-($\beta$-sulfato-ethylsulfonyl)phenyl-amino | 0 | 2.2 | turquoise (605) |
| 39 | 2-Methoxy-5-($\beta$-sulfato-ethylsulfonyl)phenyl-amino | 1 | 3 | turquoise (604) |
| 40 | 2-Methoxy-5-($\beta$-sulfato-ethylsulfonyl)phenyl-amino | 1 | 2 | turquoise (604) |
| 41 | 2-Methoxy-4-($\beta$-sulfato-ethylsulfonyl)phenyl-amino | 0 | 4 | turquoise (604) |
| 42 | 2-Methoxy-4-($\beta$-sulfato-ethylsulfonyl)phenyl-amino | 0 | 3 | turquoise (604) |
| 43 | 2-Methoxy-4-($\beta$-sulfato-ethylsulfonyl)phenyl-amino | 0 | 2.2 | turquoise (604) |
| 44 | 2-Methoxy-4-($\beta$-sulfato-ethylsulfonyl)phenyl-amino | 1 | 3 | turquoise (603) |
| 45 | 2-Methoxy-4-($\beta$-sulfato-ethylsulfonyl)phenyl-amino | 1 | 2 | turquoise (603) |
| 46 | N-Ethyl-4-($\beta$-sulfato-ethylsulfonyl)phenyl-amino | 0 | 4 | turquoise (603) |
| 47 | N-Ethyl-4-($\beta$-sulfato-ethylsulfonyl)phenyl-amino | 0 | 3 | turquoise (603) |
| 48 | N-Ethyl-4-($\beta$-sulfato-ethylsulfonyl)phenyl-amino | 0 | 2.2 | turquoise (603) |
| 49 | N-Ethyl-4-($\beta$-sulfato-ethylsulfonyl)phenyl-amino | 1 | 3 | turquoise (603) |
| 50 | N-Ethyl-4-($\beta$-sulfato-ethylsulfonyl)phenyl-amino | 0 | 4 | turquoise (603) |
| 51 | N-Ethyl-3-($\beta$-sulfato-ethylsulfonyl)phenyl-amino | 0 | 4 | turquoise (603) |
| 52 | N-Ethyl-3-($\beta$-sulfato-ethylsulfonyl)phenyl-amino | 0 | 3 | turquoise (603) |
| 53 | N-Ethyl-3-($\beta$-sulfato-ethylsulfonyl)phenyl-amino | 0 | 2.2 | turquoise (603) |
| 54 | N-Ethyl-3-($\beta$-sulfato-ethylsulfonyl)phenyl-amino | 1 | 3 | turquoise (603) |
| 55 | N-Ethyl-3-($\beta$-sulfato-ethylsulfonyl)phenyl-amino | 0 | 4 | turquoise (603) |
| 56 | 2-Sulfo-5-($\beta$-sulfato-ethylsulfonyl)phenyl amino | 0 | 4 | turquoise (599) |
| 57 | 2-Sulfo-5-($\beta$-sulfato-ethylsulfonyl)phenyl amino | 0 | 3 | turquoise (599) |
| 58 | 2-Sulfo-5-($\beta$-sulfato-ethylsulfonyl)phenyl amino | 0 | 2.2 | turquoise (599) |
| 59 | 2-Sulfo-5-($\beta$-sulfato-ethylsulfonyl)phenyl amino | 1 | 3 | turquoise (598) |
| 60 | 2-Sulfo-5-($\beta$-sulfato-ethylsulfonyl)phenyl amino | 0 | 4 | turquoise (598) |
| 61 | 2-Carboxy-5-($\beta$-sulfato-ethylsulfonyl)phenyl-amino | 0 | 4 | turquoise (599) |
| 62 | 2-Carboxy-5-($\beta$-sulfato-ethylsulfonyl)phenyl-amino | 0 | 3 | turquoise (599) |
| 63 | 2-Carboxy-5-($\beta$-sulfato- | 0 | 2.2 | turquoise |

-continued

Copper phthalocyanine dyes of the formula (A)

| Ex. | Radical G | Index a | Index b | Hue |
|---|---|---|---|---|
| | ethylsulfonyl)phenyl-amino | | | (599) |
| 64 | 2-Carboxy-5-($\beta$-sulfato-ethylsulfonyl)phenyl-amino | 1 | 3 | turquoise (597) |
| 65 | 2-Carboxy-5-($\beta$-sulfato-ethylsulfonyl)phenyl-amino | 0 | 4 | turquoise (597) |
| 66 | 2-Hydroxy-5-($\beta$-sulfato-ethylsulfonyl)phenyl-amino | 0 | 4 | turquoise (602) |
| 67 | 2-Hydroxy-5-($\beta$-sulfato-ethylsulfonyl)phenyl-amino | 0 | 3 | turquoise (602) |
| 68 | 2-Hydroxy-5-($\beta$-sulfato-ethylsulfonyl)phenyl-amino | 0 | 2.2 | turquoise (602) |
| 69 | 2-Hydroxy-5-($\beta$-sulfato-ethylsulfonyl)phenyl-amino | 1 | 3 | turquoise (603) |
| 70 | 2-Hydroxy-5-($\beta$-sulfato-ethylsulfonyl)phenyl-amino | 1 | 2.2 | turquoise (603) |
| 71 | 2-Hydroxy-4-($\beta$-sulfato-ethylsulfonyl)phenyl-amino | 0 | 4 | turquoise (602) |
| 72 | 2-Hydroxy-4-($\beta$-sulfato-ethylsulfonyl)phenyl-amino | 0 | 3 | turquoise (602) |
| 73 | 2-Hydroxy-4-($\beta$-sulfato-ethylsulfonyl)phenyl-amino | 0 | 2.2 | turquoise (602) |
| 74 | 2-Hydroxy-4-($\beta$-sulfato-ethylsulfonyl)phenyl-amino | 1 | 2 | turquoise (603) |
| 75 | 2-Hydroxy-4-($\beta$-sulfato-ethylsulfonyl)phenyl-amino | 1 | 3 | turquoise (603) |
| 76 | 2-[4'-($\beta$-Sulfatoethyl-sulfonyl)phenyl]ethyl-amino | 0 | 4 | turquoise (605) |
| 77 | 2-[4'-($\beta$-Sulfatoethyl-sulfonyl)phenyl]ethyl-amino | 0 | 3 | turquoise (605) |
| 78 | 2-[4'-($\beta$-Sulfatoethyl-sulfonyl)phenyl]ethyl-amino | 0 | 2.2 | turquoise (605) |
| 79 | 2-[4'-($\beta$-Sulfatoethyl-sulfonyl)phenyl]ethyl-amino | 1 | 3 | turquoise (604) |
| 80 | 2-[4'-($\beta$-Sulfatoethyl-sulfonyl)phenyl]ethyl-amino | 1 | 2 | turquoise (604) |
| 81 | N,N-Bis-[2-($\beta$-chloro-ethylsulfonyl)ethyl]-amino | 0 | 4 | turquoise (599) |
| 82 | N,N-Bis-[2-($\beta$-chloro-ethylsulfonyl)ethyl]-amino | 0 | 3 | turquoise (599) |
| 83 | N,N-Bis-[2-($\beta$-chloro-ethylsulfonyl)ethyl]-amino | 0 | 2.2 | turquoise (599) |
| 84 | N,N-Bis-[2-($\beta$-chloro-ethylsulfonyl)ethyl]-amino | 1 | 2 | turquoise (600) |
| 85 | N,N-Bis-[2-($\beta$-chloro-ethylsulfonyl)ethyl]-amino | 1 | 3 | turquoise (600) |
| 86 | 2-[2'-($\beta$-Sulfatoethyl-sulfonyl)ethoxy]ethyl-amino | 0 | 4 | turquoise (600) |
| 87 | 2-[2'-($\beta$-Sulfatoethyl-sulfonyl)ethoxy]ethyl-amino | 0 | 3 | turquoise (600) |
| 88 | 2-[2'-($\beta$-Sulfatoethyl-sulfonyl)ethoxy]ethyl-amino | 0 | 2.2 | turquoise (600) |
| 89 | 2-[2'-($\beta$-Sulfatoethyl-sulfonyl)ethoxy]ethyl-amino | 1 | 3 | turquoise (601) |
| 90 | 2-[2'-($\beta$-Sulfatoethyl-sulfonyl)ethoxy]ethyl-amino | 1 | 2 | turquoise (601) |
| 91 | 2-[2'-($\beta$-Chloroethyl-sulfonyl)ethoxy]ethyl-amino | 0 | 4 | turquoise (604) |
| 92 | 2-[2'-($\beta$-Chloroethyl-sulfonyl)ethoxy]ethyl-amino | 0 | 3 | turquoise (604) |
| 93 | 2-[2'-($\beta$-Chloroethyl-sulfonyl)ethoxy]ethyl-amino | 0 | 2.2 | turquoise (604) |
| 94 | 2-[2'-($\beta$-Chloroethyl-sulfonyl)ethoxy]ethyl-amino | 1 | 3 | turquoise (604) |
| 95 | 2-[2'-($\beta$-Chloroethyl-sulfonyl)ethoxy]ethyl-amino | 1 | 2 | turquoise (604) |
| 96 | 2,5-Di($\beta$-sulfatoethyl-sulfonyl)phenylamino | 0 | 4 | turquoise (604) |
| 97 | 2,5-Di($\beta$-sulfatoethyl-sulfonyl)phenylamino | 0 | 3 | turquoise (604) |
| 98 | 2,5-Di($\beta$-sulfatoethyl-sulfonyl)phenylamino | 0 | 2.2 | turquoise (604) |
| 99 | 2,5-Di($\beta$-sulfatoethyl-sulfonyl)phenylamino | 1 | 3 | turquoise (603) |
| 100 | 2,5-Di($\beta$-sulfatoethyl-sulfonyl)phenylamino | 1 | 2 | turquoise (603) |

EXAMPLE 101

138 parts of copper phthalocyaninetetrasulfonyl chloride are stirred in 75 parts of a 25% aqueous ammonia solution at 40° to 60° C. for a period of several hours, the precipitated copper phthalocyaninetetrasulfonamide is then filtered off, dissolved in 1000 parts of water at a pH of 10 to 14, and a suspension of 38 parts of cyanuric chloride in 200 parts of water is added to this solution. This reaction is carried out at a pH of between 9 and 11 and a temperature of between 0° and 3° C.

4.1 parts of cyanamide are added to the solution obtained of the copper dichlorotriazinylphthalocyaninesulfonamide compound. The reaction is carried out at a pH of between 4 and 9 and a temperature of between 20° and 40° C. 28 parts of 4-($\beta$-sulfatoethylsulfonyl)aniline are then added, and the reaction is completed at a pH of 3.5 to 6 and a temperature of between 40° and 90° C.

The copper phthalocyanine dye according to the invention obtained has, written in the form of the free acid, the formula

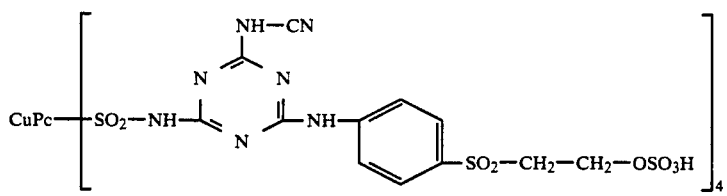

($\lambda_{max}$ = 599 nm).

It is isolated as the alkali metal salt (sodium salt) by evaporation of the synthesis solution under reduced pressure or by spray-drying. It has very good fiber-reactive properties and is highly suitable for the dyeing of the materials mentioned in the description, in particular cellulose fiber materials, by the dyeing and printing processes customary in the art for fiber-reactive dyes, to give turquoise dyeings and prints of high color strength and good fastness properties, of which in particular the good light, wet light and chlorine fastness properties may be mentioned.

EXAMPLE 102

To prepare a copper phthalocyanine dye according to the invention, the procedure of Example 101 is repeated, except that in the last reaction step the same amount of 3-($\beta$-sulfatoethylsulfonyl)aniline is used instead of the 4-($\beta$-sulfatoethylsulfonyl)aniline. The dye according to the invention has an absorption maximum in the visible range at 599 nm and exhibits the same coloristic properties as the dye of Example 101 according to the invention.

EXAMPLE 103

138 parts of copper phthalocyaninetrisulfonyl chloride are stirred in 75 parts of an aqueous 25% ammonia solution at 40° to 60° C. over a period of several hours, the precipitated copper phthalocyaninetrisulfonamide is then filtered off, dissolved in 1000 parts of water at a pH of 10 to 14, 230 parts of an aqueous suspension of 28 parts of cyanuric chloride are added to this solution, and the condensation reaction is carried out at a pH of between 9 and 11 and a temperature of between 0° and 3° C. 3.1 parts of cyanamide are then added to the solution obtained of the copper dichlorotriazinylphthalocyaninesulfonamide compound, and the reaction is carried out at a pH of between 8 and 10 and at a temperature of between 20° and 40° C. This is followed by the reaction with 21 parts of 4-($\beta$-sulfatoethylsulfonyl)aniline at a pH of between 3.5 and 6 and a temperature of between 40 and 90° C.

The dye according to the invention obtained which, written in the form of the free acid, has the formula is isolated as the alkali metal salt (sodium salt) by evaporation of the synthesis solution under reduced pressure or by spray-drying. It has fiber-reactive properties and is highly suitable as dye for the dyeing of the materials mentioned in the description, in particular cellulose fiber materials, by the dyeing procedures customary in the art, to give turquoise dyeings and prints of high color strength an good fastness properties, of which in particular the light, wet light and chlorine fastness properties may be mentioned.

EXAMPLE 104

To prepare a copper phthalocyanine dye according to the invention, the procedure of Example 103 is repeated, except that in the last reaction step the same amount of 3-($\beta$-sulfatoethylsulfonyl)aniline is used instead of the 4-($\beta$-sulfatoethylsulfonyl)aniline. The dye according to the invention has an absorption maximum in the visible range at 599 nm and exhibits the same coloristic properties as the dye of Example 103 according to the invention.

Example 105

138 parts of copper phthalocyaninesulfonyl chloride having on average 2.2 chlorosulfonyl groups in the copper phthalocyanine molecule are stirred in 75 parts of a 25% aqueous ammonia solution at 40° to 60° C. over a period of several hours, the precipitated copper phthalocyanine-sulfonamide is then filtered off, dissolved in 1000 parts of water at a pH of 10 to 14, 220 parts of an aqueous suspension of 21 parts of cyanuric chloride are added to this solution, and the reaction is carried out at a pH of between 9 and 11 and at a temperature of between 0° and 3° C. 2.35 parts of cyanamide are added and reacted with copper dichlorotriazinylphthalocyaninesulfonamide compound obtained at 20° to 40° C. and at a pH of from 8 to 10. This cyanamidochloro-triazinylamino compound is then reacted with 16 parts of 4-($\beta$-sulfatoethylsulfonyl)aniline at a pH of 3.5 to 6 and a temperature of between 40° and 90° C.

The copper phthalocyanine dye according to the invention obtained has, written in the form of the free acid, the formula

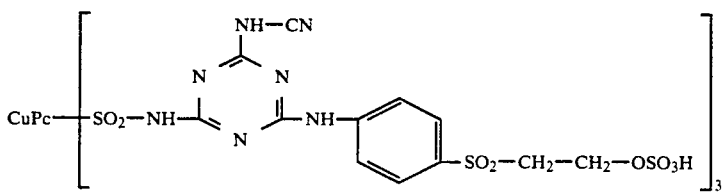

($\lambda_{max}$ = 599 nm).

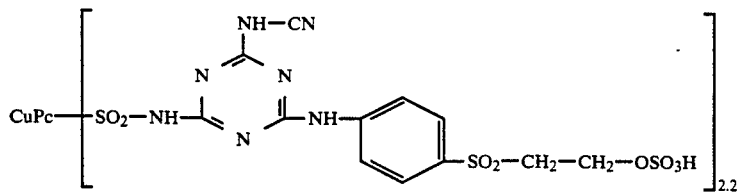

($\lambda_{max}$ = 599 nm).

It is isolated as the alkali metal salt (sodium salt) by evaporation of the synthesis solution under reduced pressure or by spray-drying. It has very good fiber-reactive properties and is highly suitable for the dyeing of the materials mentioned in the description, in particular cellulose fiber materials, by the dyeing and printing processes customary in the art for fiber-reactive dyes, to give turquoise dyeings and prints of high color strength and good fastness properties, of which in particular the good light, wet light and chlorine fastness properties may be mentioned.

EXAMPLE 106

To prepare a copper phthalocyanine dye according to the invention, the procedure of Example 105 is repeated, except that in the last reaction step the same amount of 3-(β-sulfatoethylsulfonyl)aniline is used instead of the 4-(β-sulfatoethylsulfonyl)aniline. The dye according to the invention likewise has an absorption maximum in the visible range at 599 nm and exhibits the same coloristic properties as the dye of Example 105 according to the invention.

EXAMPLES 107 TO 200

In the Table Examples which follow, further novel copper phthalocyanine dyes the formula (B)

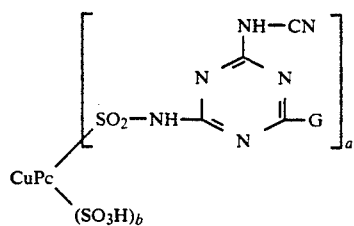

are described by means of their formula components. They can be prepared by the procedure according to the invention, for example according to one of Examples 101 to 106, using their components apparent from the particular Table Example in combination with the formula (B) (for example, a sulfo-containing or sulfo-free copper phthalocyaninesulfonyl chloride, ammonia, cyanuric chloride, cyanamide and a fiber-reactive amino compound of the formula (8) given in the description). They have very good fiber-reactive dyestuff properties and produce dyeings and prints of high color strength on the materials mentioned in the description, in particular cellulose fiber materials, such as cotton, by the known dyeing and printing methods, in the hue listed in the particular Table Example for dyeings on cotton.

| | Copper phthalocyanine dyes of the formula (B) | | | |
|---|---|---|---|---|
| Ex. | Radical G | Index a | Index b | Hue |
| 107 | 4-(β-Sulfatoethyl-sulfonyl)phenylamino | 1 | 3 | turquoise (598) |
| 108 | 4-(β-Sulfatoethyl-sulfonyl)phenylamino | 1 | 2 | turquoise (598) |
| 109 | 3-(β-Sulfatoethyl-sulfonyl)phenylamino | 1 | 3 | turquoise (598) |
| 110 | 3-(β-Sulfatoethyl-sulfonyl)phenylamino | 1 | 2 | turquoise (598) |
| 111 | 2-(β-Sulfatoethyl-sulfonyl)phenylamino | 0 | 4 | turquoise (599) |
| 112 | 2-(β-Sulfatoethyl-sulfonyl)phenylamino | 0 | 3 | turquoise (599) |
| 113 | 2-(β-Sulfatoethyl-sulfonyl)phenylamino | 0 | 2.2 | turquoise (599) |
| 114 | 2-(β-Sulfatoethyl-sulfonyl)phenylamino | 1 | 3 | turquoise (598) |
| 115 | 2-(β-Sulfatoethyl-sulfonyl)phenylamino | 1 | 2 | turquoise (598) |
| 116 | 3-(β-Sulfatoethyl-sulfonyl)propylamino) | 0 | 4 | turquoise (605) |
| 117 | 3-(β-Sulfatoethyl-sulfonyl)propylamino) | 0 | 3 | turquoise (605) |
| 118 | 3-(β-Sulfatoethyl-sulfonyl)propylamino) | 0 | 2.2 | turquoise (605) |
| 119 | 3-(β-Sulfatoethyl-sulfonyl)propylamino) | 1 | 3 | turquoise (604) |
| 120 | 3-(β-Sulfatoethyl-sulfonyl)propylamino) | 1 | 2 | turquoise (604) |
| 121 | 2-(β-Sulfatoethyl-sulfonyl)ethylamino | 0 | 4 | turquoise (606) |
| 122 | 2-(β-Sulfatoethyl-sulfonyl)ethylamino | 0 | 3 | turquoise (606) |
| 123 | 2-(β-Sulfatoethyl-sulfonyl)ethylamino | 0 | 2.2 | turquoise (606) |
| 124 | 2-(β-Sulfatoethyl-sulfonyl)ethylamino | 1 | 3 | turquoise (605) |
| 125 | 2-(β-Sulfatoethyl-sulfonyl)ethylamino | 1 | 2 | turquoise (605) |
| 126 | 3-(β-Chloroethyl-sulfonyl)propylamino | 0 | 4 | turquoise (607) |
| 127 | 3-(β-Chloroethyl-sulfonyl)propylamino | 0 | 3 | turquoise (607) |
| 128 | 3-(β-Chloroethyl-sulfonyl)propylamino | 0 | 2.2 | turquoise (607) |
| 129 | 3-(β-Chloroethyl-sulfonyl)propylamino | 1 | 3 | turquoise (605) |
| 130 | 3-(β-Chloroethyl-sulfonyl)propylamino | 1 | 2 | turquoise (605) |
| 131 | 2-(β-Chloroethyl-sulfonyl)ethylamino | 0 | 4 | turquoise (601) |
| 132 | 2-(β-Chloroethyl-sulfonyl)ethylamino | 0 | 3 | turquoise (601) |
| 133 | 2-(β-Chloroethyl-sulfonyl)ethylamino | 0 | 2.2 | turquoise (601) |
| 134 | 2-(β-Chloroethyl-sulfonyl)ethylamino | 1 | 3 | turquoise (603) |
| 135 | 2-(β-Chloroethyl-sulfonyl)ethylamino | 1 | 2 | turquoise (603) |
| 136 | 2-Methoxy-5-(β-sulfato-ethylsulfonyl)phenyl-amino | 0 | 4 | turquoise (604) |
| 137 | 2-Methoxy-5-(β-sulfato-ethylsulfonyl)phenyl-amino | 0 | 3 | turquoise (604) |

-continued

Copper phthalocyanine dyes of the formula (B)

| Ex. | Radical G | Index a | Index b | Hue |
|---|---|---|---|---|
| 138 | 2-Methoxy-5-(β-sulfatoethylsulfonyl)phenylamino | 0 | 2.2 | turquoise (604) |
| 139 | 2-Methoxy-5-(β-sulfatoethylsulfonyl)phenylamino | 1 | 3 | turquoise (604) |
| 140 | 2-Methoxy-5-(β-sulfatoethylsulfonyl)phenylamino | 1 | 2 | turquoise (604) |
| 141 | 2-Methoxy-4-(β-sulfatoethylsulfonyl)phenylamino | 0 | 4 | turquoise (605) |
| 142 | 2-Methoxy-4-(β-sulfatoethylsulfonyl)phenylamino | 0 | 3 | turquoise (605) |
| 143 | 2-Methoxy-4-(β-sulfatoethylsulfonyl)phenylamino | 0 | 2.2 | turquoise (604) |
| 144 | 2-Methoxy-4-(β-sulfatoethylsulfonyl)phenylamino | 1 | 3 | turquoise (603) |
| 145 | 2-Methoxy-4-(β-sulfatoethylsulfonyl)phenylamino | 1 | 2 | turquoise (603) |
| 146 | N-Ethyl-4-(β-sulfatoethylsulfonyl)phenylamino | 0 | 4 | turquoise (604) |
| 147 | N-Ethyl-4-(β-sulfatoethylsulfonyl)phenylamino | 0 | 3 | turquoise (604) |
| 148 | N-Ethyl-4-(β-sulfatoethylsulfonyl)phenylamino | 0 | 2.2 | turquoise (604) |
| 149 | N-Ethyl-4-(β-sulfatoethylsulfonyl)phenylamino | 1 | 3 | turquoise (604) |
| 150 | N-Ethyl-4-(β-sulfatoethylsulfonyl)phenylamino | 0 | 4 | turquoise (604) |
| 151 | N-Ethyl-3-(β-sulfatoethylsulfonyl)phenylamino | 0 | 4 | turquoise (604) |
| 152 | N-Ethyl-3-(β-sulfatoethylsulfonyl)phenylamino | 0 | 3 | turquoise (604) |
| 153 | N-Ethyl-3-(β-sulfatoethylsulfonyl)phenylamino | 0 | 2.2 | turquoise (604) |
| 154 | N-Ethyl-3-(β-sulfatoethylsulfonyl)phenylamino | 1 | 3 | turquoise (604) |
| 155 | N-Ethyl-3-(β-sulfatoethylsulfonyl)phenylamino | 0 | 4 | turquoise (604) |
| 156 | 2,5-Di(β-sulfoethylsulfonyl)phenylamino | 0 | 4 | turquoise (600) |
| 157 | 2,5-Di(β-sulfoethylsulfonyl)phenylamino | 0 | 3 | turquoise (600) |
| 158 | 2,5-Di(β-sulfoethylsulfonyl)phenylamino | 0 | 2.2 | turquoise (600) |
| 159 | 2,5-Di(β-sulfoethylsulfonyl)phenylamino | 1 | 3 | turquoise (599) |
| 160 | 2,5-Di(β-sulfoethylsulfonyl)phenylamino | 0 | 4 | turquoise (599) |
| 161 | 2-Carboxy-5-(β-sulfatoethylsulfonyl)phenylamino | 0 | 4 | turquoise (598) |
| 162 | 2-Carboxy-5-(β-sulfatoethylsulfonyl)phenylamino | 0 | 3 | turquoise (598) |
| 163 | 2-Carboxy-5-(β-sulfatoethylsulfonyl)phenylamino | 0 | 2.2 | turquoise (598) |
| 164 | 2-Carboxy-5-(β-sulfatoethylsulfonyl)phenylamino | 1 | 3 | turquoise (597) |
| 165 | 2-Carboxy-5-(β-sulfatoethylsulfonyl)phenylamino | 0 | 4 | turquoise (597) |
| 166 | 2-Hydroxy-5-(β-sulfatoethylsulfonyl)phenylamino | 0 | 4 | turquoise (604) |
| 167 | 2-Hydroxy-5-(β-sulfatoethylsulfonyl)phenylamino | 0 | 3 | turquoise (604) |
| 168 | 2-Hydroxy-5-(β-sulfatoethylsulfonyl)phenylamino | 0 | 2.2 | turquoise (604) |
| 169 | 2-Hydroxy-5-(β-sulfatoethylsulfonyl)phenylamino | 1 | 3 | turquoise (603) |
| 170 | 2-Hydroxy-5-(β-sulfatoethylsulfonyl)phenylamino | 1 | 2.2 | turquoise (603) |
| 171 | 2-Hydroxy-4-(β-sulfatoethylsulfonyl)phenylamino | 0 | 4 | turquoise (605) |
| 172 | 2-Hydroxy-4-(β-sulfatoethylsulfonyl)phenylamino | 0 | 3 | turquoise (605) |
| 173 | 2-Hydroxy-4-(β-sulfatoethylsulfonyl)phenylamino | 0 | 2.2 | turquoise (605) |
| 174 | 2-Hydroxy-4-(β-sulfatoethylsulfonyl)phenylamino | 1 | 2 | turquoise (604) |
| 175 | 2-Hydroxy-4-(β-sulfatoethylsulfonyl)phenylamino | 1 | 3 | turquoise (604) |
| 176 | 2-[4'-(β-Sulfatoethylsulfonyl)phenyl]ethylamino | 0 | 4 | turquoise (607) |
| 177 | 2-[4'-(β-Sulfatoethylsulfonyl)phenyl]ethylamino | 0 | 3 | turquoise (607) |
| 178 | 2-[4'-(β-Sulfatoethylsulfonyl)phenyl]ethylamino | 0 | 2.2 | turquoise (607) |
| 179 | 2-[4'-(β-Sulfatoethylsulfonyl)phenyl]ethylamino | 1 | 3 | turquoise (606) |
| 180 | 2-[4'-(β-Sulfatoethylsulfonyl)phenyl]ethylamino | 1 | 2 | turquoise (606) |
| 181 | N,N-Bis-[2-(β-chloroethylsulfonyl)ethyl]amino | 0 | 4 | turquoise (599) |
| 182 | N,N-Bis-[2-(β-chloroethylsulfonyl)ethyl]amino | 0 | 3 | turquoise (599) |
| 183 | N,N-Bis-[2-(β-chloroethylsulfonyl)ethyl]amino | 0 | 2.2 | turquoise (599) |
| 184 | N,N-Bis-[2-(β-chloroethylsulfonyl)ethyl]amino | 1 | 2 | turquoise (597) |
| 185 | N,N-Bis-[2-(β-chloroethylsulfonyl)ethyl]amino | 1 | 3 | turquoise (597) |
| 186 | 2-[2'-(β-Sulfatoethylsulfonyl)ethoxy]ethylamino | 0 | 4 | turquoise (606) |
| 187 | 2-[2'-(β-Sulfatoethylsulfonyl)ethoxy]ethylamino | 0 | 3 | turquoise (606) |
| 188 | 2-[2'-(β-Sulfatoethylsulfonyl)ethoxy]ethylamino | 0 | 2.2 | turquoise (606) |
| 189 | 2-[2'-(β-Sulfatoethylsulfonyl)ethoxy]ethylamino | 1 | 3 | turquoise (605) |

-continued
Copper phthalocyanine dyes of the formula (B)

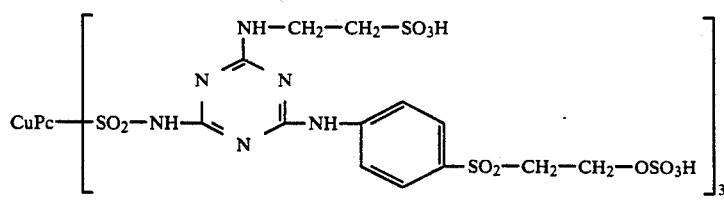

($\lambda_{max}$ = 604 nm).

| Ex. | Radical G | Index a | Index b | Hue |
|---|---|---|---|---|
| 190 | 2-[2'-($\beta$-Sulfatoethyl-sulfonyl)ethoxy]ethyl-amino | 1 | 2 | turquoise (605) |
| 191 | 2-[2'-($\beta$-Chloroethyl-sulfonyl)ethoxy]ethyl-amino | 0 | 4 | turquoise (606) |
| 192 | 2-[2'-($\beta$-Chloroethyl-sulfonyl)ethoxy]ethyl-amino | 0 | 3 | turquoise (606) |
| 193 | 2-[2'-($\beta$-Chloroethyl-sulfonyl)ethoxy]ethyl-amino | 0 | 2.2 | turquoise (606) |
| 194 | 2-[2'-($\beta$-Chloroethyl-sulfonyl)ethoxy]ethyl-amino | 1 | 3 | turquoise (606) |
| 195 | 2-[2'-($\beta$-Chloroethyl-sulfonyl)ethoxy]ethyl-amino | 1 | 2 | turquoise (606) |
| 196 | 2-Sulfo-5-($\beta$-sulfato-ethylsulfonyl)phenylamino | 0 | 4 | turquoise (600) |
| 197 | 2-Sulfo-5-($\beta$-sulfato-ethylsulfonyl)phenylamino | 0 | 3 | turquoise (600) |
| 198 | 2-Sulfo-5-($\beta$-sulfato-ethylsulfonyl)phenylamino | 0 | 2.2 | turquoise (600) |
| 199 | 2-Sulfo-5-($\beta$-sulfato-ethylsulfonyl)phenylamino | 1 | 3 | turquoise (600) |
| 200 | 2-Sulfo-5-($\beta$-sulfato-ethylsulfonyl)phenylamino | 1 | 2 | turquoise (600) |

EXAMPLE 201

An alkaline aqueous solution of copper phthalocyaninetrisulfonamide is prepared is the procedure of Example 103, this solution is then added to a suspension of 19 parts of cyanuric chloride in 200 parts of water, and the reaction is carried out at a temperature of between 0° and 3° C. while maintaining a pH of 10 by means of aqueous sodium hydroxide solution. After reaction is complete, 13 parts of 2-sulfoethylamine are added to the reaction batch, and the second condensation reaction is carried out at a pH of between 5 and 6 and a temperature of between 10° and 30° C. The third condensation reaction is then carried out at a pH of 3 to 4 and a temperature of between 75° and 80° C. with 21 parts of 4-($\beta$-sulfatoethylsulfonyl)aniline.

The copper phthalocyanine dye according to the invention obtained has, written in the form of the free acid, the formula

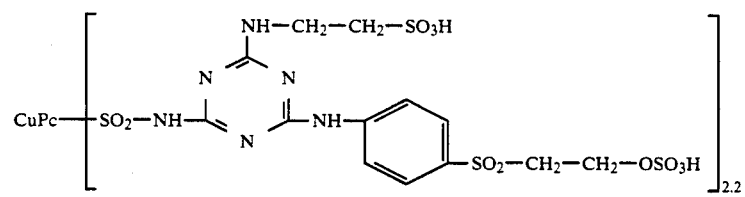

($\lambda_{max}$ = 604 nm).

It can be isolated as the alkali metal salt (sodium salt) by evaporation of the synthesis solution under reduced pressure or by spray-drying. It has very good fiber-reactive properties and is highly suitable for the dyeing of the materials mentioned in the description, in particular cellulose fiber materials, by the dyeing processes customary in the art, to give turquoise dyeings and prints of high color strength and good fastness properties, of which in particular the good light, wet light and chlorine fastness properties may be mentioned.

EXAMPLE 202

13 parts of 2-sulfoethylamine are added to a suspension of 19 parts of cyanuric chloride in 200 parts of water, and the reaction is carried out at a temperature of between 0° and 3° C. while maintaining a pH range from 5 to 6 by means of sodium carbonate. The alkaline aqueous solution of the copper phthalocyaninesulfonamide prepared according to Example 105 is added to the reaction solution obtained, and the reaction with the dichloro(sulfoethylamino)-s-triazine is carried out at a temperature of 10° to 30° C. and a pH of 10 to 11. The third condensation reaction is then carried out with 21 parts of 4-($\beta$-sulfatoethylsulfonyl)aniline at a pH of 3 to 4 and a temperature of 75° to 80° C.

The copper phthalocyanine dye obtained which, written in the form of the free acid, has the formula

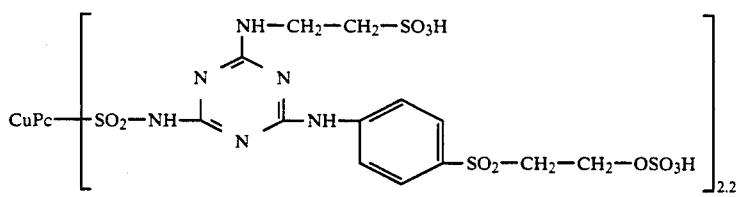

($\lambda_{max}$ = 603 nm).

can be isolated as the alkali metal salt (sodium salt) by evaporation of the synthesis solution under reduced pressure or by spray-drying. It has the same coloristic properties as the dye of Example 201 and produces turquoise dyeings of high color strength and good fastness properties.

EXAMPLE 203

The aqueous alkaline solution of the copper phthalocyaninetrisulfonamide prepared by the procedure of Example 103 is added to a suspension of 14 parts of cyanuric fluoride in 100 parts of water, and the reaction is carried out at a pH of between 9 and 10 and a temperature of about 0° C. 21 parts of 4-($\beta$-sulfatoethylsulfonyl)aniline are added to the solution obtained of the copper difluorotriazinylphthalocyaninesulfonamide compound; the second condensation reaction is carried out at a pH of between 4 and 5 and a temperature of between 10° and 30° C.

The phthalocyanine dye according to the invention which, written in the form of the free acid, has the formula

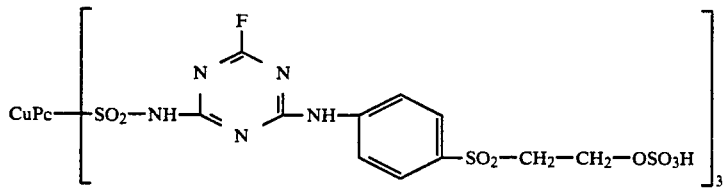

($\lambda_{max}$ = 604 nm).

is obtained as the alkali metal salt (sodium salt) by spray-drying on the synthesis solution. The dye according to the invention has very good dyeing properties and produces turquoise dyeings of high color strength and good fastness properties corresponding to those of the dyeings of the dye from Example 3 in particular on cellulose fiber materials.

EXAMPLES 204 TO 225

In the Table Examples which follow, further copper phthalocyanine dyes according to the invention of the formula (C)

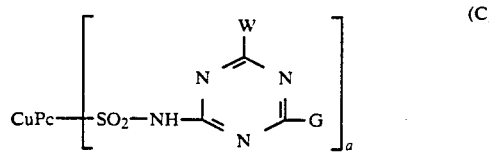

(C)

are described by means of their formula components. They can be prepared by the procedure according to the invention, for example according to one of Examples 201 and 202 or 203, using their components of formula (8) apparent from the particular Table Example in combination with the formula (C). They have very good fiber-reactive dyestuff properties and produce dyeings and prints of high color strength on the materials mentioned in the description, in particular cellulose fiber materials, such as cotton, by the known dyeing and printing processes, in the hue listed in the particular Table Example for dyeings on cotton.

| Ex. | Radical G | Radical W | Index a | Hue |
|---|---|---|---|---|
| 204 | 4-($\beta$-Sulfatoethyl-sulfonyl)phenylamino | $\beta$-sulfo-ethylamino | 4 | turquoise (603) |
| 205 | 3-($\beta$-Sulfatoethyl-sulfonyl)phenylamino | $\beta$-sulfo-ethylamino | 4 | turquoise (603) |
| 206 | 3-($\beta$-Sulfatoethyl-sulfonyl)phenylamino | $\beta$-sulfo-ethylamino | 3 | turquoise (603) |
| 207 | 3-($\beta$-Sulfatoethyl-sulfonyl)phenylamino | $\beta$-sulfo- | 2.2 | turquoise |
| 208 | 3-($\beta$-Sulfatoethyl-sulfonyl)propylamino | $\beta$-sulfo-ethylamino | 4 | turquoise (605) |
| 209 | 3-($\beta$-Sulfatoethyl-sulfonyl)propylamino | $\beta$-sulfo-ethylamino | 3 | turquoise (605) |
| 210 | 3-($\beta$-Sulfatoethyl-sulfonyl)propylamino | $\beta$-sulfo-ethylamino | 2.2 | turquoise (605) |
| 211 | 3-($\beta$-Chloroethyl-sulfonyl)propylamino | $\beta$-sulfo-ethylamino | 4 | turquoise (605) |
| 212 | 3-($\beta$-Chloroethyl-sulfonyl)propylamino | $\beta$-sulfo-ethylamino | 3 | turquoise (605) |
| 213 | 3-($\beta$-Chloroethyl-sulfonyl)propylamino | $\beta$-sulfo-ethylamino | 2.2 | turquoise (605) |
| 214 | 2-[2'-($\beta$-Sulfato-ethylsulfonyl)-ethoyx]ethylamino | $\beta$-sulfo-ethylamino | 3 | turquoise (604) |
| 215 | 2-[2'-($\beta$-Sulfato-ethylsulfonyl)-ethoyx]ethylamino | $\beta$-sulfo-ethylamino | 2.2 | turquoise (604) |
| 216 | 2-[2'-($\beta$-Chloroethyl-sulfonyl)ethoxy]ethyl-amino | $\beta$-sulfo-ethylamino | 3 | turquoise (604) |
| 217 | 2-[2'-($\beta$-Chloroethyl-sulfonyl)ethoxy]ethyl-amino | $\beta$-sulfo-ethylamino | 2.2 | turquoise (604) |
| 218 | 2-[2'-($\beta$-Chloroethyl-sulfonyl)ethoxy]ethyl-amino | methoxy | 3 | turquoise (605) |
| 219 | 4-($\beta$-Sulfatoethyl-sulfonyl)phenylamino | methoxy | 3 | turquoise (604) |
| 220 | 3-($\beta$-Sulfatoethyl-sulfonyl)phenylamino | methoxy | 3 | turquoise (604) |
| 221 | 3-($\beta$-Sulfatoethyl-sulfonyl)propylamino | methoxy | 3 | turquoise (606) |
| 222 | 3-($\beta$-Sulfatoethyl-sulfonyl)propylamino | methoxy | 3 | turquoise (606) |
| 223 | 3-($\beta$-Sulfatoethyl-sulfonyl)propylamino | fluorine | 3 | turquoise (604) |
| 224 | 3-($\beta$-Sulfatoethyl-sulfonyl)propylamino | fluorine | 3 | turquoise (606) |
| 225 | 3-($\beta$-Sulfatoethyl-sulfonyl)propylamino | fluorine | 3 | turquoise (606) |

EXAMPLE 226

To prepare a nickel phthalocyanine dye according to the invention, the procedure of Example 3 is repeated, except that the same amount of nickel phthalocyanine-trisulfonyl chloride is used instead of the copper phthalocyaninetrisulfonyl chloride starting compound.

The nickel phthalocyanine dye according to the invention is obtained as the alkali metal salt (sodium salt). Written in the form of the free acid, it has the formula

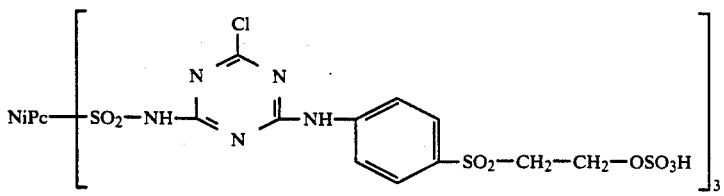

($\lambda_{max}$ = 588 nm).

and has very good fiber-reactive dye properties. It produces turquoise dyeings and prints of high color strength and good fastness properties, of which in particular light, wet light and chlorine fastness properties may be mentioned, on the materials mentioned in the description, in particular on cotton, by the dyeing and printing processes customary in the art for fiber-reactive dyes.

EXAMPLE 227

To prepare a nickel phthalocyanine dye according to the invention, the procedure of Example 226 is repeated, except that in the last reaction step the same amount of 3-($\beta$-sulfatoethylsulfonyl)aniline is used instead of the 4-($\beta$-sulfatoethylsulfonyl)aniline. The dye according to the invention has an absorption maximum in the visible range at 588 nm and exhibits the same coloristic properties as the dye of Example 226 according to the invention.

We claim:

1. A water-soluble phthalocyanine dye of the formula

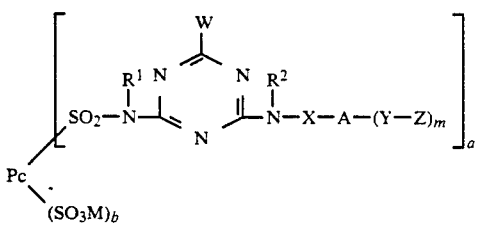

in which:

Pc is the radical of a metal-free or metal-containing phthalocyanine, the sulfonamide and sulfo groups being bound in the 3-position and/or 4-position of the carbocyclic aromatic rings of said phthalocyanine, and optionally substituted in the 3-position and/or 4-position of said carbocyclic aromatic rings by halogen or phenyl;

$R^1$ is hydrogen or alkyl of 1 to 4 carbon atoms;

$R^2$ is hydrogen or alkyl of 1 to 4 carbon atoms;

A is phenylene, naphthylene, or phenylene or naphthylene both of which are substituted by 1 to 3 substituents selected from the group consisting of lower alkyl, lower alkoxy, halogen, carboxy, nitro and sulfo, or is alkylene of 1 to 8 carbon atoms, or is alkylene of 2 to 8 carbon atoms which is interrupted by 1 or 2 hetero groups;

X is a direct bond or a divalent organic binding link;

Y is a direct bond or a group —CO—NH—alkylene— where alkylene has the meaning defined for A, or is alkylene of 1 to 6 carbon atoms, or is a group

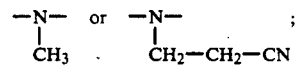

Z is vinylsulfonyl, or is ethylsulfonyl substituted in the $\beta$-position by a substituent which is eliminated by alkali, or is $\beta$-hydroxyethylsulfonyl;

m is the number 1 or 2;

W is halogen, sulfo, phenylsulfonyl, alkylsulfonyl of 1 to 4 carbon atoms, alkoxy of 1 to 4 carbon atoms or naphthyloxy, naphthyloxy substituted by sulfo, phenoxy or phenoxy substituted by one or two of the following substituents: methyl, ethyl, methoxy, ethoxy, chlorine, carboxy or sulfo, or is an amino group of the formula

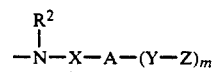

in which $R^2$, X, A, Y, Z and m have one of the abovementioned meanings, or is an amino group of the formula

in which $R^3$ is hydrogen, alkyl of 1 to 4 carbon atoms, alkyl of 1 to 4 carbon atoms which is substituted by hydroxy, sulfato, sulfo, carboxy or phosphato, or is cycloalkyl of 5 to 8 carbon atoms, and $R^4$ is hydrogen, alkyl of 1 to 4 carbon atoms, alkyl of 1 to 4 carbon atoms which is substituted by hydroxy, sulfo, carboxy, sulfato or phosphato, or is phenyl or phenyl substituted by 1, 2, or 3 of the following: alkyl of 1 to 4 carbon atoms, alkoxy of 1 to 4 carbon atoms, halogen, carboxy, nitro or sulfo, or is cyano, or $R^3$ and $R^4$, together with the nitrogen, form the radical of a 4- to 8-membered heterocyclic ring, having an alkylene of 3 to 8 carbon atoms, or having a further N-atom or an O-atom and two alkylenes of 1 to 4 carbon atoms;

a is an integer from 1 to 4;

b is an integer from zero to 3;

the sum of (a+b) is 1 to 4;

M is a hydrogen atom or an alkali metal, or another salt-forming metal.

2. A phthalocyanine dye as claimed in claim 1, wherein W is chlorine or fluorine.

3. A phthalocyanine dye as claimed in claim 1, wherein $R^1$ or $R^2$ or both are hydrogen.

4. A phthalocyanine dye as claimed in claim 1, wherein X is an alkylene of 1 to 6 carbon atoms, or an alkyleneamino of the formula —alkylene—N(R)— in which alkylene is an alkylene of 1 to 6 carbon atoms, and R is hydrogen or alkyl of 1 to 4 carbon atoms, or is a group of the formula

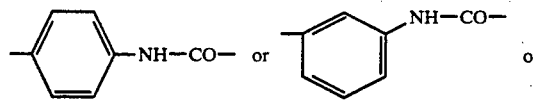

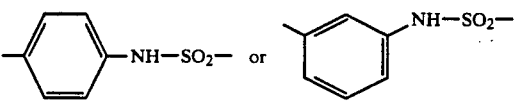

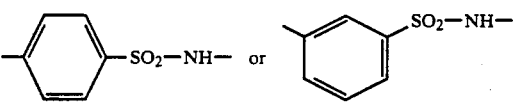

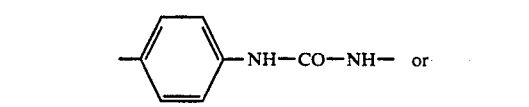

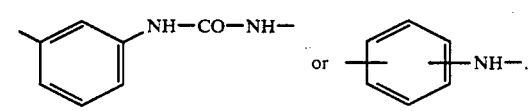

5. A phthalocyanine dye as claimed in claim 1, wherein X and Y are each a direct bond and m is the number 1.

6. A phthalocyanine dye as claimed in claim 1, wherein W is chlorine or fluorine, X and Y are each a direct bond, m is the number 1 and A is a phenylene unsubstituted or substituted by 1 to 3 substituents selected from the group consisting of alkyl of 1 to 4 carbon atoms, alkoxy of 1 to 4 carbon atoms, halogen, carboxy, nitro and sulfo.

7. A phthalocyanine dye as claimed in claim 1, wherein W is chlorine, X and Y are both a direct bond, m is the number 1 and A is a meta- or para- phenylene.

8. A phthalocyanine dye as claimed in claim 1, wherein W is chlorine or fluorine, X and Y are both a direct bond, m is the number 1 and A is alkylene of 2 to 6 carbon atoms or alkylene of 2 to 6 carbon atoms interrupted by —O— or —NH—.

9. A phthalocyanine dye as claimed in claim 1, wherein W is chlorine, X and Y are both a direct bond, m is the number 1 and A is 1,3-propylene.

10. A phthalocyanine dye as claimed in claim 1, wherein W is a group of the formula —NR³R⁴ where R³ and R⁴ are defined as in claim 1.

11. A phthalocyanine dye as claimed in claim 10, wherein X and Y are both a direct bond and m is the number 1.

12. A phthalocyanine dye as claimed in claim 11, wherein A is phenylene or phenylene substituted by 1 to 3 substituents selected from the group consisting of alkyl of 1 to 4 carbon atoms, alkoxy of 1 to 4 carbon atoms, halogen, carboxy, nitro and sulfo.

13. A phthalocyanine dye as claimed in claim 10, wherein X and Y are both a direct bond, m is the number 1 and A is alkylene of 2 to 6 carbon atoms, or alkylene of 2 to 6 carbon atoms interrupted by a hetero group.

14. A phthalocyanine dye as claimed in claim 1, wherein W is cyanamido.

15. A phthalocyanine dye as claimed in claim 14, wherein X and Y are both a direct bond and m is the number 1.

16. A phthalocyanine dye as claimed in claim 15, wherein A is a meta- or para- phenylene.

17. A phthalocyanine dye as claimed in claim 15, wherein A is n-propylene.

18. A phthalocyanine dye as claimed in claim 1, wherein Z is β-sulfatoethylsulfonyl.

19. A phthalocyanine dye as claimed in claim 1, wherein Pc is a nickel phthalocyanine radical or a copper phthalocyanine radical.

* * * * *